United States Patent Office 3,658,848
Patented Apr. 25, 1972

3,658,848
METHOD FOR PRODUCTION OF ASCORBIC ACID-3-PHOSPHATE
Hiroaki Nomura, Minoo, Toshihiro Ishiguro, Suita, and Kihachiro Maeda, Kobe, Japan, assignors to Takeda Chemical Industries, Ltd., Osaka, Japan
No Drawing. Filed Oct. 31, 1968, Ser. No. 772,428
Claims priority, application Japan, Oct. 31, 1967, 42/70,136
Int. Cl. C07d 5/12
U.S. Cl. 260—343.7   8 Claims

ABSTRACT OF THE DISCLOSURE

Ascorbic acid-3-phosphate is produced by phosphorylation of ascorbic acid whose hydroxyl groups at 5- and 6-positions are either masked or unmasked. Phosphorylation is carried out in a solvent of which the dielectric constant measured at 20° C. and $10 \times 10^3$ cycles/sec. at 20° C. is not less than 23.

---

This invention is concerned with an improvement in production of ascorbic acid-3-phosphate.

Ascorbic acid-3-phosphate has hitherto been produced by the phosphorylation of ascorbic acid whose hydroxyl groups at 5- and 6-positions are either masked or unmasked with phosphoric acid halide in lower aliphatic ketone (e.g. acetone, methyl ethylketone, methyl isobutyl ketone) in the presence of a base.

However, this known method has such defects that non-specific phosphorylation occurs at both hydroxyl groups of 2- and 3-positions of ascorbic acid so that the yield of the object ascorbic acid 3-phosphate is inevitably low and moreover that many troublesome procedures for the separation of ascorbic acid-3-phosphate from ascorbic acid-2-phosphate as well as from other minor phosphorylation products are required.

The present inventors have found unexpectedly that solely the hydroxy group at the 3-position of the ascorbic acid is selectively phosphorylated, when ascorbic acid—the hydroxyl groups at 5- and 6-positions of which are masked or unmasked—is allowed to react with a phosphoric acid halide in a solvent of which the dielectric constant measured at 20° C. and $10 \times 10^3$ cycles/sec. at 20° C. is not less than 23.

In this specification, the starting material, i.e. ascorbic acid whose hydroxyl groups at 5- and 6-positions are masked or unmasked, will be abbreviated as "A.C.," and the dielectric constants are shown as measured at 20° C. and $10 \times 10^3$ cycles/sec. throughout this specification.

It is the principal object of the present invention to provide a novel and industrially feasible method for the selective production of ascorbic acid-3-phosphate with good yield.

It is another object of the invention to prepare ascorbic-3-phosphate of high purity and low cost in a short period of time.

According to the present invention said objects are realized by phosphorylating A.C. with phosphoric acid halide in a solvent of which the dielectric constant is not less than 23 in the presence of a base.

The solvent to be used in this invention may be of any type, insofar as it has a dielectric constant not less than 23 and does not affect the reaction adversely, irrespective of whether it is a single component solvent or a mixed solvent. Typical single solvents accompanied with the parenthesized figures which show respective dielectric constants are exemplified as follows, acetonitrile (36.6), methanol (32.6), glycerine (42.5), nitrobenzene (34.8), dimethylformamide (36.7), trimethyl phosphate (24.0), N-methylacetamide (165), water (80) and formamide (109).

As to the mixed solvent, at least one of the individual solvents of which it is constituted should posses the dielectric constant not less than 23, but the values of the other solvents may be less than 23. Stated differently, it is only sufficient that the dielectric constant of the mixed solvents as such be not less than 23. Typical such mixed solvents include, among others, a 1:1 mixture 30 of acetone and dimethylformamide, a 2:1 mixture 66 of water and acetone, a 1:1 mixture 37 of water and dioxane, and a 1:1 mixture 54 of water and pyridine.

Phosphoric acid halide of the present method comprises, for example, phosphorochloridic acid, phosphorodichloridic acid, phosphorofluoridic acid, phosphorobromidic acid, phosphorus oxychloride, phosphorus oxybromide, phosphorus pentachloride, pyrophosphoryl tetrachloride, etc. These agents can be successfully employed.

While the amount of said phosphoric acid halide should vary with the type of the solvent, the reaction temperature and the type of the said halide, it is generally preferable to use an equimolar to several molar amounts of the halide and, for better results, an equimolar to bimolar amount of the halide relative to A.C.

As the ascorbic acid whose hydroxyl groups at 5- and 6-positions are masked, there may generally be employed a condensation product between ketone of $C_3$-$C_{10}$ and ascorbic acid.

As typical examples of such ketone there may be counted acetone, methyl ethyl ketone, diethyl ketone, cyclopentanone and cyclohexanone. Generally speaking, the use of isopropylidene-ascorbic acid is the most advantageous.

A base in the present invention may be either inorganic or organic.

Typical examples of the inorganic bases are alkali metal hydroxides such as sodium hydroxide, potassium hydroxide etc., alkaline earth metal hydroxides such as calcium hydroxide, barium hydroxide, etc., alkali metal carbonates such as sodium carbonate, potassium carbonate, etc., alkaline earth metal carbonates such as calcium hydrogen carbonate, magnesium hydrogen carbonate, etc., metal oxide such as calcium oxide, magnesium oxide, etc. and ammonia. As the organic base use can be made of, for example, various aliphatic amines such as dimethylamine, trimethylamine, triethylamine, dicyclohexylamine, etc., and aromatic or cyclic bases such as dimethylaniline, pyridine, N-methylmorpholine, N-ethylpiperidine, lutidine, collidine, quinoline, etc. It is necessary to employ at least an equimolar amount of the base relative to A.C., and to use the base in excess and in general, for further improved results, two to twenty times the equimolar amount. In the case of a strong alkali such as sodium hydroxide or potassium hydroxide, it is advisable to employ not more than 8 times of the base to A.C., for avoiding the formation of various phosphates as the reaction product.

The reaction generally goes to completion in a short period of time, e.g. 10 minutes to a few hours, when conducted in the neighborhood of 0° C., although it may be carried out either at elevated temperature or at lower temperature. Better results are likely to be attained, however, when the reaction is carried out below 15° C.

When the resultant is the ascorbic acid-3-halo-phosphate derivative it is hydrolyzed in the conventional manner to give rise to ascorbic acid-3-phosphate in good yield and high purity. The aforementioned hydrolysis rapidly proceeds merely upon the addition of water to the reaction mixture. Meanwhile, when the resultant is 5,6-masked ascorbic acid-3-phosphate, it is hydrolized with a mineral acid (e.g. hydrochloric acid, sulfonic acid)

or acidic ion exchange resins (e.g. sulfonated polystyrene) in the presence of water to give ascorbic acid-3-phosphate.

The end product may be isolated in a metal salt form, more particularly as the salt of sodium, magnesium or calcium, for example.

The present method for the production of ascorbic acid-3-phosphate is advantageous from an industrial point of view, since the desired ascorbic acid-3-phosphate is selectively obtained in a good yield, accordingly, the procedure for the isolation of the objective is simplified.

Following are presently preferred illustrative embodiments of this invention. In these examples, the parts by weight bear the same relationship to parts by volume as do grams to milliliters.

EXAMPLE 1

10 parts by weight of 5,6-isopropylidene-ascorbic acid and 21.8 parts by weight of pyridine are dissolved in 30 parts by volume of water, and below 0° C., 7.8 parts by weight of phosphorus oxychloride are added dropwise to the resulting solution with constant stirring. After the addition is complete, the stirring is further continued for 90 minutes at the same temperature as above. In this example, the conversion is 94.5%. After the reaction mixture is allowed to revert to room temperature, it is poured onto a column of sulfonated polystyrene bead resins (commercially available as Amberlite IR-120, H+ form). The effluent is neutralized with magnesium oxide and the mixture is concentrated in vacuo. Ethanol is added dropwise to the concentrate and the resulting white powdery crystals are collected by filtration. The above procedure yields 13.2 parts by weight of the magnesium salt of ascorbic acid-3-phosphate. This salt is allowed to recrystallize from water-ethanol.

The product gave the following elemental analysis: $C_6H_7O_9 \cdot P \cdot Mg \cdot 4H_2O$. Calcd. (percent): C, 20.55; H, 4.32; P, 8.84; Mg, 6.94. Found (percent): C, 20.35; H, 4.26; P, 8.65; Mg, 7.29.

EXAMPLE 2

10 parts by weight of 5,6-isopropylidene-ascorbic acid and 29.4 parts by weight of magnesium oxide are dissolved in 100 parts by volume of a 2:1 mixture of water and acetone.

Below 0° C., 14.2 parts by weight of phosphorus oxychloride is added dropwise to the resulting solution with constant stirring. After the addition is complete, the stirring is further continued for 90 minutes at the same temperature. In this example, the conversion is 78%. The reaction mixture is treated in the same manner as in Example 1 to yield 10.9 parts by weight of the magnesium salt of ascorbic acid-3-phosphate. In this example, substantially the same result is obtained by the use of dioxane in place of acetone.

EXAMPLE 3

8.3 parts by weight of ascorbic acid and 11.5 parts by weight of calcium hydroxide are dissolved in 30 parts by volume of water. At a temperature below 0° C., 7.5 parts by weight of phosphorus oxychloride is added dropwise to the resulting solution with constant stirring. After the addition is complete, the stirring is continued for a further 90 minutes at the same temperature. The conversion is 70.6%. The reaction mixture is treated in the same manner as in Example 1 to yield 9.9 parts by weight of the magnesium salt of ascorbic acid-3-phosphate.

EXAMPLE 4

10 parts by weight of 5,6-isopropylidene-ascorbic acid and 9.8 parts by weight of sodium carbonate are dissolved into a mixture of 3 parts by volume of water and 100 parts by volume of dimethylformamide to prepare a solution. At a temperature below 0° C., 8.6 parts by weight of phosphorus oxychloride is added dropwise to the solution with constant stirring. After the addition is complete, the stirring is continued for a further 90 minutes at the same temperature into a mixture of 3 parts by volume of water and 100 parts by volume of dimethylformamide to prepare a solution. At a temperature below 0° C., 8.6 parts by weight of phosphorus oxychloride is added dropwise to the solution with constant stirring. After the addition is complete, the stirring is continued for a further 90 minutes at the same temperature.

In this example, the conversion is 94.5%. The reaction mixture is treated in the same manner as in Example 1 to yield 13.1 parts by weight of the magnesium salt of ascorbic acid-3-phosphate.

EXAMPLE 5

10 parts by weight of 5,6-isopropylidene-ascorbic acid, 9.8 parts by weight of sodium carbonate, are dissolved into a mixture of 50 parts by weight of trimethyl phosphate and 15 parts by volume of water, and 8.6 parts by weight of phosphorus oxychloride is thereto added with stirring at a temperature below 0° C. At the same temperature, the mixture is stirred for further 60 minutes, at the end of which time 100 parts by volume of water is added. (In this example, the conversion is 95%). Then, the above hydrolysate is passed through a column of sulfonated polystyrene bead resins (commercially available as Amberlite IR-120, H+ form), whereby the former is desalted. The effluent is poured onto a column of quaternary ammonium type strongly basic anion exchange resins in bead form (commercially available as Dowex 1 X8, Cl− form), whereupon the ascorbic acid-3-phosphate contained in the effluent is adsorbed on the resin. The resin is washed with water and, then, with 0.05 N-hydrochloric acid. Thereafter, the ascorbic acid-3-phosphate is eluted out with 0.3 N-hydrochloric acid. The eluate is neutralized with magnesium oxide and, then, concentrated. 120 parts by volume of ethanol is added to the concentrate, the resulting white powdery crystals are collected by filtration. The above procedure yields 12 parts by weight of the magnesium salt of ascorbic acid-3-phosphate.

EXAMPLE 6

8.3 parts by weight of ascorbic acid and 15.5 parts by weight of calcium carbonate are dissolved into a mixture of 50 parts by volume of trimethyl phosphate and 100 parts by volume of water under cooling, and at a temperature below 0° C., 7.5 parts by volume of phosphorus oxychloride is added dropwise to the resulting solution. Under the same temperature conditions, the mixture is stirred for further 60 minutes, at the end of which time 100 parts by volume of water is added. (In this example, the conversion of the starting material is 70%.) The above hydrolysate is treated in the same manner as in Example 5 to yield 8.9 parts by weight of the magnesium salt of ascorbic acid-3-phosphate.

The infra-red and ultra-violet and electrophoretic data for the resultant of each example are in good agreement with those of the authentic sample.

What is claimed is:

1. In a method for the production of ascorbic-3-phosphate through the phosphorylation of ascorbic acid, whose hydroxyl groups at 5- and 6-positions are either masked or unmasked, with a phosphoric acid halide in the presence of a base, an improvement in which the phoshporylation is carried out in a solvent whose dielectric constant at 20° C. and $10 \times 10^3$ cycles/sec. is not less than 23.

2. An improvement claimed in claim 1, wherein the solvent is water.

3. An improvement claimed in claim 1, wherein the solvent is trimethyl phosphate.

4. An improvement claimed in claim 1, wherein the solvent is dimethylformamide.

5. An improvement claimed in claim 1, wherein the solvent is a mixture of water and a member selected from the group consisting of dimethylformamide, dioxane and acetone.

6. An improvement claimed in claim 1, wherein a phosphoric acid halide is phosphorous oxychloride.

7. An improvement claimed in claim 1, wherein the ascorbic acid is 5,6-isopropylidene-ascorbic acid.

8. An improvement according to claim 1, wherein the reaction temperature is below 15° C.

References Cited

UNITED STATES PATENTS

| | | | |
|---|---|---|---|
| 2,443,473 | 6/1948 | Milas | 260—461 |
| 3,188,309 | 6/1965 | Mukaiyama et al. | 260—343.7 |
| 3,201,388 | 8/1965 | Tsuchiya et aal. | 260—211.5 |
| 3,288,780 | 11/1966 | Tsuchiya et al. | 260—211.5 |
| 3,382,232 | 5/1968 | Honjo et al. | 260—211.5 |
| 3,407,190 | 10/1968 | Honjo et al. | 260—211.5 |

OTHER REFERENCES

Cutolo et al.: Synthesis of 3-Phosphoric Ester of L-Ascorbic Acid, Chem. Abstracts, vol. 56, April 1962, section 8827 relied on.

ALEX MAZEL, Primary Examiner

A. M. T. TIGHE, Assistant Examiner